United States Patent [19]

Geurtsen

[11] 4,261,820

[45] Apr. 14, 1981

[54] APPARATUS FOR SEPARATING A MIXTURE OF LIQUIDS OF DIFFERENT SPECIFIC WEIGHTS, E.G. OIL AND WATER

[75] Inventor: Alfonsus A. Geurtsen, GT Deventer, Netherlands

[73] Assignee: Machinefabriek Geurtsen Deventer B.V., Deventer, Netherlands

[21] Appl. No.: 59,892

[22] Filed: Jul. 23, 1979

[30] Foreign Application Priority Data

Jul. 31, 1978 [NL] Netherlands .................... 7808075

[51] Int. Cl.³ ............................................ B01D 33/40
[52] U.S. Cl. .................................... 210/98; 210/108; 210/259; 210/299
[58] Field of Search ............... 210/249, 23 R, 259, 210/108, 416.5, 98, 242 R, 241, 257 R, 258, 262

[56] References Cited

U.S. PATENT DOCUMENTS

| 2,046,770 | 7/1936 | Coberly et al. ................... 210/108 |
| 3,417,015 | 12/1968 | Canevari et al. ................. 210/23 R |
| 3,628,660 | 12/1971 | Veld ................................ 210/108 X |
| 3,948,773 | 4/1976 | Tucker ............................. 210/108 |
| 4,145,280 | 3/1979 | Middelbeek et al. ........... 210/108 X |

Primary Examiner—Frank A. Spear, Jr.
Attorney, Agent, or Firm—John P. Snyder

[57] ABSTRACT

An apparatus for separating a mixture of liquids of different specific gravities, e.g. oil and water, comprising a vessel containing a settling chamber, an upper chamber and a movable partition between said chambers for controlling the process, conduits for the supply of mixture and the separate discharges of the component liquids and a second vessel containing a collecting chamber and a final liquids separating device and associated therewith conduits for the component liquids.

7 Claims, 1 Drawing Figure

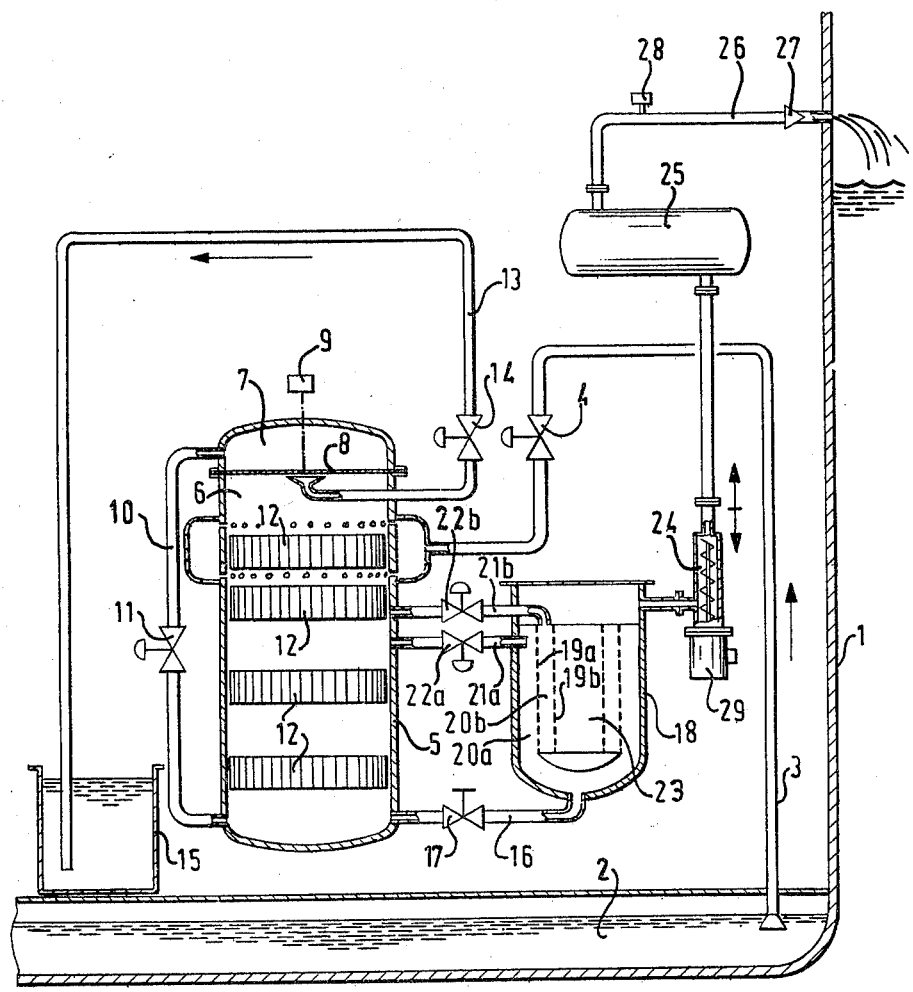

APPARATUS FOR SEPARATING A MIXTURE OF LIQUIDS OF DIFFERENT SPECIFIC WEIGHTS, E.G. OIL AND WATER

The invention relates to an apparatus for separating a mixture of liquids of different specific gravities, e.g. oil and water, said apparatus comprising a settling chamber, a wall, e.g. a diaghragm, separating said chamber at its upper end from an upper chamber which is situated above the settling chamber, said wall being mounted for vertical movement between a lowest and a highest position and used for controlling a regulating and/or signalling device, a conduit for the supply of mixture to be separated, said conduit opening into the settling chamber, a conduit for the discharge of the lighter liquid, said conduit being connected to the settling chamber near the upper end thereof, a bypass connecting the lower end of the settling chamber with the upper chamber, a collecting chamber for the heavier liquid, which communicated with the lower end of the settling chamber, a conduit for the discharge of heavier liquid, the latter conduit being connected to the collecting chamber, and a final liquids separating device consisting of one filter like element or a plurality of such elements arranged in series, said liquies separating device being disposed in the connection between the settling chamber and the collecting chamber and being capable of letting through nearly only the heavier liquid.

Apparatus, e.g. apparatus for separating the oil from water polluted by oil, of this kind is disclosed in the published Dutch patent applications Nos. 7317147, 7402216 and 7609743. The invention has the object to amend the construction of the known separating apparatus in such a manner that in many cases special advantages are obtained. The amendments proposed according to the invention consist in the first place in that the collecting chamber and the final liquids separating device are contained in a vessel separate from that which contains the settling chamber and the upper chamber. Due to this variation of construction it has become possible to dispose the vessel containing the filtering device and the collecting chamber by the side of the vessel containing the settling chamber and the upper chamber, so that in a space of given height, say a space in a ship, a separating apparatus having a settling chamber of substantially greater height than that of the known separating apparatus can be installed, whereby the separating ability of the apparatus is very much improved. Another advantage is that the installation of two vessels side-by-side makes the inspection and the replacement of the filtering device much simpler, because it is not necessary, as in the known separating apparatus, to remove the part of the common vessel containing the settling chamber, the upper chamber and the vertically movable wall from the part containing the filtering device and the collecting chamber. It has also appeared that in many occasions the construction and the assembly of two separate vessels with accessories and connections is easier and cheaper than those of one single common vessel accommodating most of the elements of the separating apparatus.

Preferably, that or each compartment situated in front of a filter-like element in the vessel accommodating the final liquids separating device and the collecting chamber is connected at or near its upper end with the settling chamber by a conduit which is provided outside the two vessels with a valve. Due to this construction the means for cleaning the or each individual filter-like element will be simpler and more convenient and easier to control than the means for that purpose contained in the common vessel of the known apparatus.

Advantageously the apparatus according to the invention may be constructed such that the settling chamber extends from the bottom of the vessel containing the settling chamber and the upper chamber to the vertically movable wall, e.g. the diaphragm, over the entire horizontal cross sectional area of the vessel and contains both in its upper and in its lower half antiturbulence members. Due to this construction the separating power of the apparatus is considerably increased and nearly pure heavier liquid, e.g. water, is already discharged from the lower end of the settling chamber, so that less strict requirements are imposed on the final liquids separating device, which means that such device can be simpler and may often consist of only one single filter-like element.

If the separating apparatus is constructed in this way, when lighter liquid, e.g. oil, is discharged from the apparatus, heavier liquid, e.g. water, is supplied through the conduit for the discharge of the heavier liquid to the vessels to clean or backwash each filter-like element. Such flow control means is conveniently provided by a rotary displacement pump. In that case it is only necessary to change the direction of rotation of the motor of the pump to reverse the flow of liquid in the discharge conduit for the heavier liquid. If the backwash water for cleaning of the final liquids separating apparatus is not readily available, a storage tank may be provided in the discharge conduit.

The invention will be further elucidated with the aid of the drawing, which illustrates diagrammatically by way of example an apparatus according to the invention for the separation of oil from a mixture of oil and water, said apparatus being installed in a ship.

A ship is designated by 1 and it has a bilge 2 in which water polluted heavily by oil is collected. Since only pure water may be drained-off into surface water, the mixture of water and oil contained in the bilge 2 must be separated before the water is discharged overboard. To that end the mixture is sucked from the bilge 2 through a conduit 3 which is provided with a valve 4 into a vessel 5 containing a settling chamber 6, an upper chamber 7 and a diaphragm 8 which separates the chambers 6 and 7 from one another and is adapted to move vertically between two end positions. The diaphragm is used to control the apparatus and is therefor coupled with a control device 9 mounted outside the vessel 5.

In the separating chamber 6 operating as a settling basin the oil contained in the supplied mixture moves upwards and the water moves downwards, so that after some time a layer of oil is formed under the diaphragm 8. In order to enable the diaphragm to move a bypass 10 is provided between the upper chamber 7 and the settling chamber 6. This bypass has a valve 11 which is used to control the diaphragm. The upper chamber is filled with water. To keep the mixture of liquids contained in the settling chamber 6 as quiet as possible parts, e.g. grating 12, to counteract turbulence are mounted both in the upper half and in the lower half of the settling chamber.

The oil collected in the upper part of the settling chamber is discharged from time to time through a conduit 13 provided with a valve 14 into a basin 15. The water which is collected in the lower part of the settling chamber 6 flows through a conduit 16 comprising a valve 17 into a second vessel 18, in which a final liquids separating device is accommodated. This device consists in the shown embodiment of two concentric cylindrical filter-like elements 19a and 19b made of cloth which let pass nearly only water. Should there be still some oil in the water flowing through the conduit 16 by the vessel 18, this oil will be retained by the elements 19a and 19b and it will be collected in the upper region of the compartments 20a and 20b which are situated in front of the elements 19a and 19b. To return the oil from the compartments 20a and 20b to the settling chamber 6 the upper part of each one of these compartments is connected by conduits 21a, 21b provided with valves 22a, 22b with the settling chamber 6.

After the final liquid separating device 19a, 19b the purified water is collected in a collecting chamber 23, from whence it is pumped by a pump 24 to a water storage tank 25. This tank is connected to an overflow pipe 26 provided with a check valve 27 closing towards the storage tank 25, said overflow pipe discharging the excess water overboard. Inboard the pipe 26 is provided with a check valve 28 opening towards the storage tank 25 and used to admit air into said tank.

The pump 24 is a screw pump driven by a motor, that means it is a reversable rotary displacement pump.

In operation, oil-water-mixture first sucked by the pump 24 from the bilge 2 into the settling chamber 6, in which the oil is separated from the mixture and it forms under the diaphragm 8 a layer which becomes thicker and thicker. Initially, the diaphragm is in its lowest position, in which position it keeps, through the control device 9, the valves 14, 22a and 22b closed and the valves 4 and 11 open. The water collecting in the lower part of the settling chamber 6 thus flows through the conduit 16 into the vessel 18, therein through the elements 19a, 19b to the water collecting chamber 23 and hence through the pump 24 and the water storage tank 25 to the outside.

When the layer of oil contained in the settling chamber 6 has obtained a predetermined thickness, the diaphragm 8 is pushed by the buoyance of the layer of oil into its highest position. Owing thereto the control device 9 opens the valves 14 and 22b and closes the valves 4 and 11, whereas the direction of rotation of the motor 29 and the pump 24 is reversed. The result thereof is that pure water is pumped by the pump 24 from the storage tank 25 through the water collecting chamber 23, and element 19b and the conduit 16 into the settling chamber 23, the oil collected in the compartment 20b situated between the elements 19a and 19b is returned to the settling chamber 6 and oil contained in the settling chamber is forced through the conduit 13 towards the basin 15. The element 19b is then rinsed by the water flowing through it in opposite or backwash direction.

When this process takes place in the separation apparatus the valves 11 and 22a are opened and the valve 22b is closed, so that the diaphragm 8 moves downwards again, the rinsing water from the tank 25 is forced through the cleaned element 19b as well as through the element 19a, this water and the oil collected in the compartment 20a of the vessel 18 are returned to the settling chamber 6 through the conduit 16 and 21a, respectively, and also the element 19a is cleaned.

As soon as the diaphragm 8 has attained its lowest position and the largest portion of the oil layer formed under the diaphragm has been discharged through the conduit 13, the valve 4 is opened, the valves 14 and 22a are closed and the direction of rotation of the motor 29 and the pump 24 is reversed by means of the control device 9, so that the described process starts again and mixture is again sucked from the bilge 2 into the settling chamber 6, the storage tank 25 is filled again with purified water and the pure excess water is drained-off overboard, till the layer of oil formed under the diaphragm 8 has become sufficiently thick to force the diaphragm upwards and to start thereby the second part of the cycle, during which oil is discharged from the settling chamber and the filters are rinsed.

It is observed that the final liquies separating device contained in the vessel 18 may also consist of one single filter-like elements or of more than two elements operating in series.

What I claim is:

1. An apparatus for separating a mixture of immiscible liquids of different specific gravities, e.g. oil and water, said apparatus comprising, in combination, a first vessel a settling chamber; an upper chamber situated above the settling chamber; a diaphragm mounted for vertical movement between a lowest and a highest position and used to control the apparatus, the two chambers and the diaphragm which forms a partition between said chambers being contained in said vessel; a pipe connecting the upper chamber with the lower end portion of the settling chamber; a conduit for the supply of mixture to be separated to the settling chamber, said supply conduit opening into the settling chamber in an intermediate zone between the lower and the upper end portion of said chamber; a conduit for the discharge of the lighter liquid from the settling chamber, said discharge conduit being connected to the settling chamber above the outlet zone of the mixture supply conduit and near the upper end of the settling chamber; a conduit for the discharge of the heavier liquid from the settling chamber, the latter conduit being connected to the settling chamber near the lower end thereof; a second vessel forming part of the discharge conduit for the heavier liquid; a final liquids separating device including at least one filter-like member which, when seen in the discharge direction of the heavier liquid, is preceded by a compartment; a collecting chamber for the heavier liquid which, when seen in the discharge direction of the latter liquid, is situated behind the final liquids separating device, the final liquids separating device and the collecting chamber being contained in said second vessel at least one return conduit extending from the upper end portion of the compartment in question of the second vessel to the settling chamber of the a zone which lies below the zone, in which the mixture supply conduit opens into the settling chamber and a valve provided in each return conduit in a portion thereof which extends outside the two vessels.

2. In a separating apparatus as claimed in claim 1 the provision of a plurality of antiturbulence member mounted one above the other in the settling chamber of the first vessel, at least one of these antiturbulence members being situated between the zone, in which the mixture supply conduit opens into the settling chamber, and the zone, in which each return conduit coming from the second vessel opens into the settling chamber.

3. In a separating apparatus as claimed in claim 1 the provision of a reversible rotary displacement pump in the discharge conduit for the heavier liquid in a place between the second vessel and the outlet of said conduit, said pump being alternately reversed and sucking mixture into the settling chamber and heavier liquid out of the collecting chamber, when operating in one direction, but delivering heavier liquid into the second vessel to wash the filter-like elements and into the settling chamber to drive lighter liquid out of the latter chamber, when operating in the other direction.

4. In a separating apparatus as claimed in claim 3 the provision of a tank for the storage of heavier liquid in the discharge conduit for the heavier liquid, said tank being situated between said pump and the outlet of said conduit.

5. Apparatus for separating a mixture of immiscible liquids of different specific gravities, e.g. oil and water, comprising in combination:

a first vessel having a diaphragm separating the interior of the vessel into an upper chamber and a lower chamber, conduit means connecting said upper and lower chambers for allowing said diaphragm to rise and fall in accord with the volume of the lighter liquid collected therebeneath and a first valve in said conduit means for controlling whether said diaphragm may so rise and fall, a lighter liquid discharge conduit having an inlet disposed immediately below said diaphragm and a second valve in said discharge conduit for controlling the flow of lighter liquid therethrough, an inlet conduit connected to said vessel below said discharge conduit for introducing the mixture of liquids into said vessel and a third valve in said inlet conduit, and a further conduit connected to the lower portion of said vessel, below said inlet conduit, for conveying the heavier liquid to and from said vessel;

a second vessel having final liquid separating means therein separating the interior of said second vessel into a purified heavier liquid chamber and at least one collecting chamber, said further conduit being connected to said collecting chamber, flow means connected to said purified heavier liquid chamber for selectively withdrawing purified heavier liquid therefrom and forcing purified heavier liquid thereinto, and a connecting conduit communicating said collecting chamber with the lower chamber of said first vessel and including a fourth valve for controlling the communication therebetween; and control means associated with said diaphragm for controlling said valves and said flow means such that, in a lowered position of said diaphragm, said first and third valves are open while said second and fourth valves are closed and said flow means withdraws the heavier liquid from the second vessel and, in a raised position of said diaphragm, said first and third valves are closed while said second and fourth valves are open and said flow means forces purified water into said second vessel.

6. Apparatus as defined in claim 5 wherein said final liquids separating means comprises at least two filter-like elements defining a second collecting chamber therebetween, a second connecting conduit communicating said second collecting chamber with said lower chamber of the first vessel and including a fifth valve for controlling the communication therebetween, said control means also controlling said fifth valve in a raised position of said diaphragm to open same while said fourth valve is closed whereby the sequential openings of said fourth and fifth valves effects sequential backwashing of said filter like elements filters.

7. Apparatus for separating a mixture of immiscible liquids of different specific gravities, e.g. oil and water, comprising in combination:

a first vessel having a vertically elongate settling chamber therein;

first conduit means connected to said settling chamber below the upper end thereof for introducing the mixture of liquids thereinto sand including first valve means for opening and closing said conduit means, lighter liquid discharge conduit means connected to an upper portion of said settling chamber for allowing lighter liquid to be discharged therefrom and including second valve means for opening and closing said discharge conduit means, and heavier liquid conduit means connected to a lower portion of said settling chamber, a second vessel having final liquids separating means therein for separating the interior of the second vessel into a secondary collecting chamber and a purified heavier liquid chamber, said heavier liquid conduit means being connnected to said secondary collecting chamber, transfer conduit means connected to an upper portion of said secondary collecting chamber and said settling chamber and including third valve means for opening and closing transfer conduit means; and flow control means for selectively (1) withdrawing purified heavier liquid from said purified heavier liquid chamber while said first valve means is open and said second and third valve means are closed whereby the lighter liquid accumulates in the upper region of said settling chamber while said heavier liquid is withdrawn from the lower region thereof and is directed into said secondary collecting chamber and is passed through said final liquids separating means prior to discharge from said purified heavier liquid chamber and (2) forcing purified heavier liquid into said purified heavier liquid chamber while said first valve means is closed and said second and third valve means are open whereby said final liquids separating means is backwashed and lighter liquid in said secondary collecting chamber is transferred through said transfer conduit means to said settling chamber while lighter liquid is discharged from said settling chamber through said first conduit means.

* * * * *